United States Patent
Hogan et al.

(10) Patent No.: US 8,199,917 B2
(45) Date of Patent: Jun. 12, 2012

(54) SID MANAGEMENT FOR ACCESS TO ENCRYPTED DRIVES

(75) Inventors: Natalie S. Hogan, Winchester (GB); Raymond Jepson, Eastleigh (GB); Andrew J. E. Menadue, Winchester (GB); Barry J. Wood, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 12/260,412

(22) Filed: Oct. 29, 2008

(65) Prior Publication Data

US 2010/0106927 A1    Apr. 29, 2010

(51) Int. Cl.
*H04L 9/00* (2006.01)
*G06F 7/04* (2006.01)

(52) U.S. Cl. ............. 380/286; 726/27; 726/28; 726/29; 726/30; 713/168; 713/169; 713/170; 713/171; 713/172

(58) Field of Classification Search .................... 380/286
See application file for complete search history.

(56) References Cited

U.S. PATENT DOCUMENTS

| 5,425,102 A | 6/1995 | Moy |
| 6,826,689 B1 * | 11/2004 | Hou ............................ 713/182 |
| 2006/0041932 A1 | 2/2006 | Cromer et al. |

OTHER PUBLICATIONS

International Search Report dated Mar. 29, 2010.
Patterson et al., "A Case for Redundant Arrays of Inexpensive Disks (RAID)".

* cited by examiner

*Primary Examiner* — Longbit Chai
(74) *Attorney, Agent, or Firm* — Scully, Scott, Murphy & Presser, P.C.; Randall J. Bluestone, Esq.

(57) ABSTRACT

A method and a system for unlocking a storage device that has become locked or cannot be unlocked are disclosed. A hint is generated from a key by removing bits and adding bits. A position of removed bits, a position of added bits, the number of removed bits and the number of added bits are stored and known securely. When the key cannot unlock a storage device corresponding to the key, the position of removed bits, the position of added bits, the number of removed bits (N) and the number of added bits are retrieved. Then, the added bits are removed in the hint. Each possible N bits are placed in the hint at the position of removed bits to generate $2^N$ possible keys. Then, each of $2^N$ possible key are tried to unlock the storage device.

20 Claims, 5 Drawing Sheets

SID MANAGEMENT FOR ACCESS TO ENCRYPTED DRIVES

BACKGROUND OF THE INVENTION

1. Fields of the Invention

The present invention generally relates to Security Identifier (SID) management of encrypted storage devices. More particularly, the present invention relates to recovering a SID when the SID was lost or was corrupted.

2. Description of the Prior Art

A storage device, e.g., a magnetic disk, an optical disk, a solid state drive, a hard disk, a compact disc, a digital versatile disc, a flash memory card, a direct access storage device (DASD), can encrypt all data that is stored in it. When data is written to the storage device, the storage device encrypts the data by using an encryption/decryption algorithm. When data is read from the storage device, the storage device decrypts the data by using the encryption/decryption algorithm. The encryption/decryption algorithm is made to be nearly impossible to decode encrypted data unless an encrypting key is known, resulting in a high level of data security. The encryption/decryption takes place on the storage device itself and is managed by a firmware (i.e., a computer program that is embedded in a hardware device) on the storage device.

The firmware enables access to encrypted data by means of a SID which is set, prior to using the storage device, to a private value understood only by an owner of the data. The SID refers to an alphanumeric character string used for uniquely identifying a user or a group. Alternatively, the SID refers to a piece of information (a parameter) used to encrypt and/or decrypt data. The SID is used to lock and unlock access to a storage device and therefore data in the storage device. The data on the storage device is inaccessible while the storage device is in a locked state, (i.e., a state which only allows a user who has a valid SID to access data in the storage device).

SIDs are stored in a separate machine which manages and issues the SIDs. In order to unlock a storage device and to gain access to data in the storage device, a user or a computing device obtains a SU) from the machine and applies the SID to the storage device to access the data in the storage device. However, the machine may become corrupted. So, the SID that the machine provided may be an invalid SID. Alternatively, a SID can be corrupted between a point that the SI) is retrieved from the machine and a point that the SID is applied on a storage device.

A result of losing a validity of a SID is that a complete set of data can become permanently locked and inaccessible. If the SID is corrupted, all users who store data in storage device(s) associated with the SID can be affected. If a shared SID used for an entire storage devices becomes corrupted or lost, all the data in the storage devices cannot be recovered because the data cannot be decrypted.

Thus, it would be desirable to provide a method and system for unlocking a storage device that has become locked or cannot be unlocked in a case of that a key or SID of the storage device becomes lost or corrupted.

SUMMARY OF THE INVENTION

The present invention is a method and system for unlocking a storage device or data in the storage device that has become locked or cannot be unlocked in a case of that a key or SID of the storage device becomes lost or corrupted.

In one embodiment, there is provided a system for unlocking a storage device that has become locked or cannot be unlocked comprising:
a key manager for securely storing a key;
means for removing bits from the key;
a removed bit manager for securely storing a position of the removed bits and the number of bits of the removed bits N);
means for adding bits to the key, after removing bits from the keys, to generate a hint;
an added bit manager for securely storing a position of the added bits and the number of bits of the added bits;
means for removing the added bits from the hint at the position of the added bits, if the key in the key manager is lost or cannot unlock the storage device;
means for placing each possible N bits in the hint at the position of the removed bits to generate $2^N$ possible keys; and
means for applying each of the $2^N$ possible keys to the storage device until the storage device is unlocked.

In one embodiment, there is provided a method for unlocking a storage device that has become locked or cannot be unlocked comprising:
storing a key;
removing bits from the key;
storing a position of the removed bits and the number of bits of the removed bits (N);
adding bits to the key, after removing bits from the keys, to generate a hint;
storing a position of the added bits and the number of bits of the added bits;
removing the added bits from the hint at the position of the added bits, if the key in the key manager is lost or cannot unlock the storage device;
placing each possible N bits in the hint at the position of the removed bits to generate $2^N$ possible keys; and
applying each of the $2^N$ possible keys to the storage device until the storage device is unlocked.

In a further embodiment, the key is used to encrypt or decrypt data in a storage device by utilizing an encryption/decryption algorithm.

In a further embodiment, the position of the removed bits and the position of added bits are not known to a same organization or a same person.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

Figure 1:
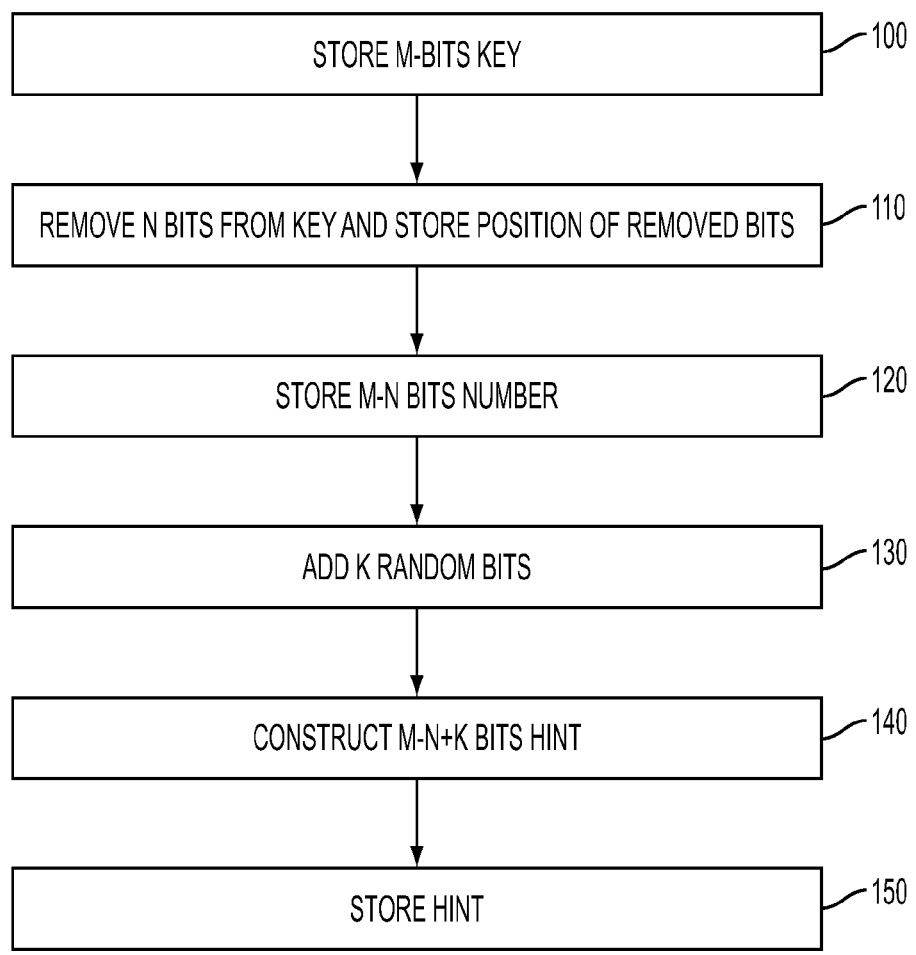
FIG. 1 illustrates method steps for generating a hint in one embodiment of the present invention.

FIG. 1 illustrates method steps for generating a hint in one embodiment of the present invention. When a key of a storage device is updated from a default manufacturing value (i.e., an initial value of a key that is temporarily assigned for a manufacturing purpose), a hint is generated to be used for unlocking a storage device in case that the key becomes lost, corrupted, unavailable, invalid or unusable. In one embodiment, the key is a M-bit binary number. However, the key can be any alphanumerical character that is used for locking or unlocking a storage device in conjunction with an encryption/decryption algorithm. The key may be a SID used for uniquely identify a user or a group. The key may be a piece of information used to encrypt or decrypt data in a storage device in conjunction with an encryption/decryption algorithm. The encryption/decryption algorithm includes, but is not limited to, RSA (Rivest Shamir Adleman), DES (Data Encryption Standard), Blowfish, IDEA (International Data Encryption Algorithm), SEAL (Software-optimized Encryption Algorithm), and RC4 (Rivest Cipher 4).

At step 100, a user stores an M-bit key in a storage device. In one embodiment, the M-bit key is securely stored in a storage device or a database, by implementing a password protection in the storage device or database. At step 110, the user removes N bits from the M-bit key and discards the removed N bits. However, the user stores the number of the removed bits (N) and a position of the removed bits. In one embodiment, the number of removed bits (N) and the position of the removed bits securely stored in a storage device or database, e.g., by implementing a password protection on the storage device or the database. In a further embodiment, the number of removed bits (N) and the position of removed bits are separately stored in different storage devices or different databases. In a further embodiment, the user removes bits at a plurality of positions. Then, the user stores the number of removed bits of each position.

After removing the N bits, at step 120, the key consists of M-N bits. At step 130, the user adds random bits to the key. The random bits can be added anywhere in the key. In one embodiment, the number of random bits (K) is equal to the N. In another embodiment, the number of random bits is different than the N. After adding the random bits, the user stores a position of the added bits and the number of added bits in a storage device or a database. The user may securely store the position and the number in the storage device or the database, by implementing a password protection on the storage device or the database. In a further embodiment, the user can add random bits at a plurality of places in the key. Then, the user stores the number of added bits and each added bit position.

After the addition of the random bits, at step 140, the key consists of M-N+K. If the number of the random bits (K) is same with the N, then the key consists of M bits at step 140. At step 150, the user stores the (M-N+K) bit key, which is constructed through steps 110-140, as a hint. The hint may be used when the key at step 100 becomes lost, invalid, unavailable or unusable due to a defect on a storage device that stores the key (i.e., key at step 100). The hint may be stored in a storage device or a database. The hint may be securely stored in a storage device or a database, e.g., by implementing a password protection on the storage device or the database. In one embodiment, the hint is a binary number being constructed through steps 110-140. In another embodiment, the hint a number, character or symbol represented by an ASCII code.

In one embodiment, the position(s) of the removed bits, the number of removed bits at each removed position, the position(s) of the added bits and the number of added bits at each added position are managed by or known to each different organization and/or each different person. Therefore, the key cannot be reconstructed from the hint by a single organization or a single person. How to reconstruct a key from the hint is described in detail later.

Figure 2:
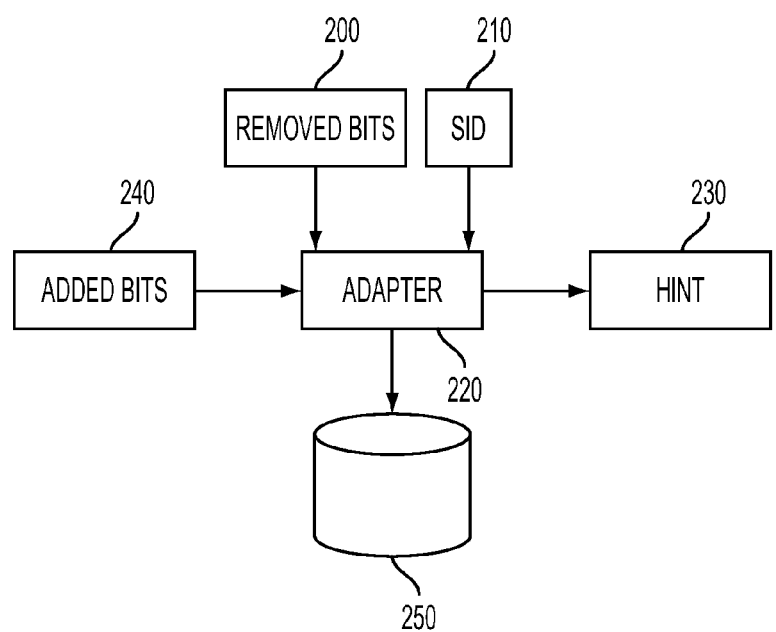
FIG. 2 illustrates a system diagram in one embodiment of the present invention.

FIG. 2 illustrates a system diagram in one embodiment of the present invention. FIG. 2 depicts that an adapter interface module 220 executed at the data storage device that constructs a hint after receiving a key (e.g., a SID), information of removed bits 200 (i.e., the position(s) of the removed bits and/or the number of the removed bits at each position) and information of added bits 240 (i.e., the position(s) of the added bits and/or the number of added bits at each position). The adapter 220 is attached to storage devices (e.g., a disk 250) and provides various storage algorithms such as a redundancy or RAID (Redundant Array of Independent Disks). The redundancy or the RAID is described in Patterson, et al., "A Case for Redundant Arrays of Inexpensive Disks (RAID)" (hereinafter "Patterson"), SIGMOD Conference, 1988, incorporated by reference as fully set forth herein. In one embodiment, the adapter 220 is an interface between a computing device (not shown) that a user is using and a storage device (e.g., a disk 250) where the user stores data.

When a key (e.g., a SID 210) is created by a user or an operating system (e.g., Microsoft Windows®), the adapter 220 receives the key (e.g., the SID 210) from the user or operating system of the interfacing computing device (not shown). Then, the user or the operating system may provide the information of the removed bits 200. The information of the removed bits 200 includes, but is not limited to: position(s) of removed bits and the number of removed bits at each position. In other words, the information 200 specifies positions where bits are removed and the number of bits to be removed at each position. Then, the adapter 200 removes the specified number of bits at the specified position(s).

After removing the specified number of bits in the key, the adapter 220 receives the information of added bits 240 from a user or an operating system. The user or the operating system that provides the information 240 may be different than the user or the operating system that provided the information 200. In another embodiment, the user or the operating system that provides the information 240 is the same as the user or the operating system that provided the information 200. The information of added bits 240 includes, but is not limited to: position(s) of added bits and the number of added bits at each position. In other words, the information 240 specifies positions where bits are added and the number of bits to be added at each position. Then, the adapter 200 adds the specified number of bits at the specified position(s).

After the specified number of bits is added in the key, the key becomes a hint 230. The hint 230 may be stored in a storage device (e.g., a disk 250).

In one embodiment, the adapter 220 is implemented as firmware associated with a storage device (e.g., a disk 250) using a programming language (e.g., Assembly language, Binary Code, C, C++, Java, NET, etc.). In one embodiment, the adapter 220 is recorded in a computer readable medium (e.g., CD (Compact Disc), DVD (Digital Versatile Disc), HDD (Hard Disk Drive), a memory) as an instruction (e.g., a machine language or assembly language) that is executed by a processor (e.g., Intel® Pentium®, IBM® Power PC®, AMD® Opteron®).

In another embodiment, the adapter 220 is implemented as hardware on a reconfigurable hardware (e.g., FPGA (Field Programmable Gate Array) or CPLD (Complex Programmable Logic Device)) using a hardware description language (Verilog, VHDL, Handel-C, or System C). In a further embodiment the adapter 220 is implemented on a semiconductor chip (e.g., ASIC (Application-Specific Integrated Circuit)) using a semi custom design methodology (i.e., designing a chip using standard cells and a hardware description language).

In a further embodiment, the adapter 220 is implemented as hardware through a computing device (e.g., a server, mainframe, desktop, laptop, etc.) by being executed in the computing device. The computing device comprises, but not limited to include, processor(s), memory(s), display device(s), input/output device(s) and network interface(s).

Figure 3:
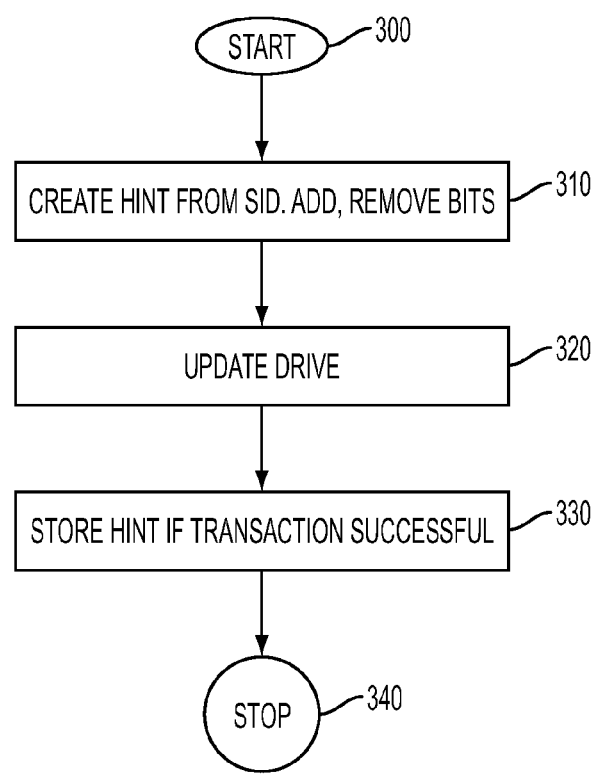
FIG. 3 illustrates method steps for storing the hint in one embodiment of the present invention.

FIG. 3 illustrates method steps for enrolling a hint in one embodiment of the present invention. At step 300, a process for enrolling a hint is started. At step 310, an adapter 220 or a firmware creates a hint from a key (e.g., a SID 210) by removing bits from the key and then adding bits in the key as described herein with respect to FIG. 1. Then, the adapter 220 or the firmware associates the created hint with the key. At step 320, the adapter 220 or the firmware may update storage device(s) related to the key to create an association with the hint.

After successfully associating the storage device(s) with the hint, at step 330, the adapter 220 or the firmware stores the hint in a storage device or a database. At step 340, the process of enrolling the hint is completed.

Figure 4:
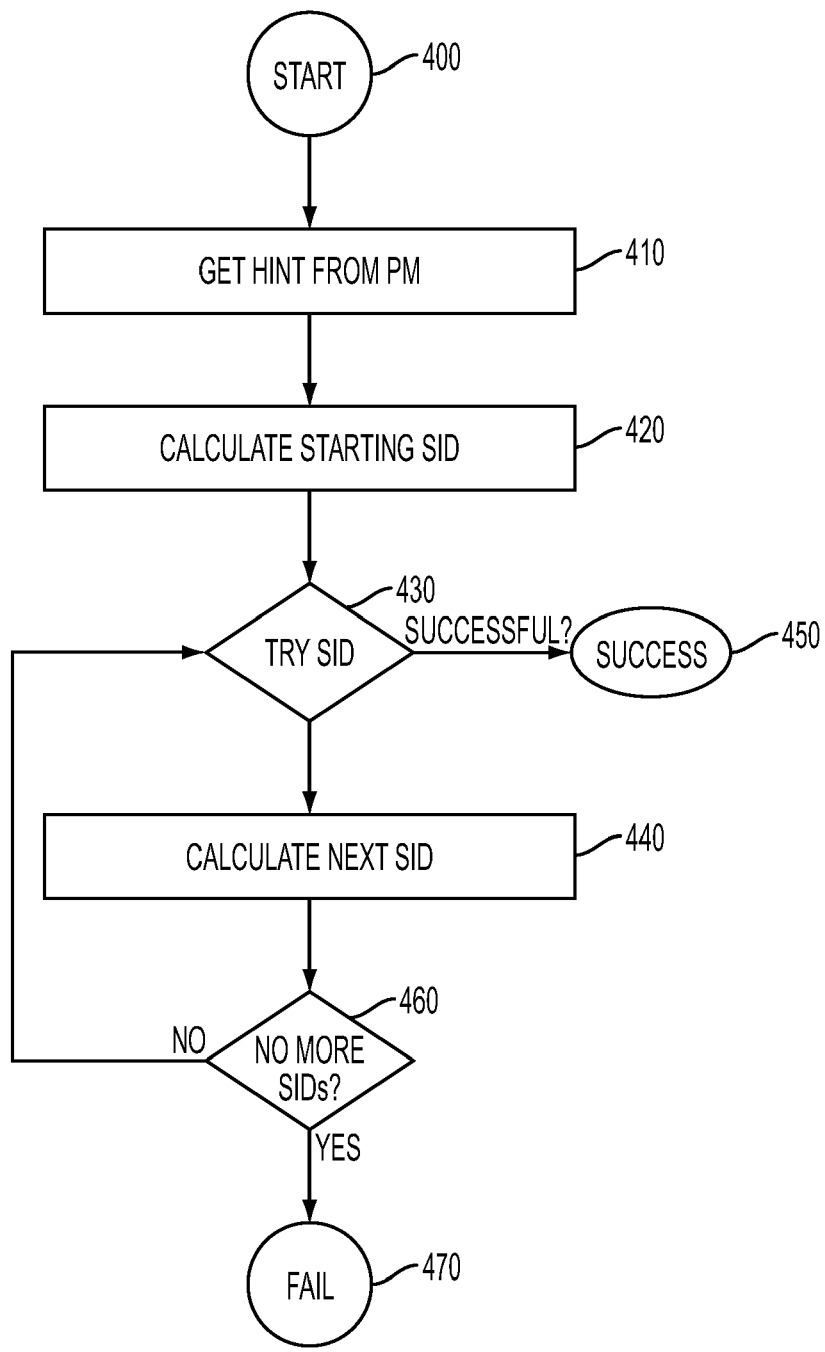
FIG. 4 illustrates method steps for unlocking a storage device with the hint in one embodiment of the present invention.

FIG. 4 illustrates method steps unlocking a locked storage device by utilizing the stored hint in one embodiment of the present invention. To retrieve data in a storage device, a user or a computing device that the user is operating may obtain a corresponding key from a storage device or a database. Then, the user provides the corresponding key to an adapter 220 to unlock the storage device or decrypt data in the storage device. However, the corresponding key may not be able to unlock the storage device or decrypt data in the storage device, because the corresponding key is corrupted. For example, a storage device or a database that stores the corresponding key had a defect that affected an original key. So, when the key was obtained from the storage device or the database, the storage device or the database provided a defected key. Alternatively, a storage device or a database provided a valid key. However, the valid key may be corrupted during its delivery to the adapter 220 or the firmware, because of a jitter on a communication path or software defect on the communication path.

When an adapter 220 fails to unlock a storage device with a provided key, at step 400, the adapter 220 may access a storage device or a database storing a hint associated with the provided key. At step 410, the adapter 220 retrieves the hint (e.g., a binary number, an ASCII code for characters, an ASCII code for numbers or an ASCII code for symbols) from the storage device or the database. At step 420, the adapter 220 calculates possible keys by performing following steps: (1) After retrieving the hint from the storage device or the database, the adapter 220 retrieves the information of added bits from a storage device or database associated with the hint. The information of added bits may specify where bits were added and how many bits were added at each position. Then, the adapter 220 removes the added bits at the each position where bits were added. After removing the added bits, the number of bits in the hint is reduced by the number of added bits.

(2) The adapter 220 retrieves the information of removed bits from a storage device or database associated with the hint. The information of removed bits may specify where bits were removed and how many bits were removed at each position. The total number of removed bits in the information of removed bits is called N.

(3) The adapter 220 place possible bits at each position where the bits were removed. The possible bits may have equal number of removed bits at that position. For example, a hint is $0101\_1100\_0110\_0000\_1111_2$. If lowest 4 bits were added bits, the adapter 220 removes the last 4 bits from the hint. Now, the hint becomes $0101\_1100\_0000_2$. If highest four bits were removed bits, the adapter places each possible 4 bits at the position of highest four bits. In other words, the hint becomes now $XXXX\_0101\_1100\_0000_2$. The "XXXX" represents each possible bits such as $0000_2$, $0001_2, \ldots, 1110, 1111_2$. In this example, there are total 16 possible bits. Generally speaking, the adapter 220 places each possible bits at each position where the bits were removed. The possible bits at each position have equal number of removed bits at that position. Thus, if the number of total removed bits is N, the adapter 16 creates $2^N$ possible keys by placing the possible bits at each position.

Returning to FIG. 4, as stated above, at step 420, the adapter 420 creates $2^N$ possible keys. The adapter 420 may select a possible key among the $2^N$ possible keys to first attempt to unlock the storage device that was failed to unlock. When selecting a possible key among the $2^N$ possible keys, the adapter 220 may arbitrarily select a possible key. Alternatively, the adapter 220 selects a possible key with a lowest value or highest value among the $2^N$ possible keys.

At step 430, the adapter 220 applies the selected possible key to unlock the storage device that was failed to unlock. If the adapter 220 can unlock the storage device with the selected possible key, at step 450, the adapter 220 stores the selected possible key as a valid key for the storage device. The valid key may be securely stored in a storage device or a database.

If, at step 430, the adapter 220 cannot unlock the storage device with the selected possible key, the adapter 220 may delete the selected possible key or may mark the selected possible key with a keyword "attempted". Then, the adapter 220 selects a next possible key among unselected possible keys. The adapter 220 may select the next possible key randomly among the unselected possible keys. Alternatively, the adapter 220 may select a lowest or highest possible key as the next possible key. If there the adapter 200 fails to select the next possible key, at step 460, the adapter 220 checks whether all the possible keys are evaluated or whether there is an unselected possible key. If all the possible keys are evaluated or if there is no unselected possible key, at step 470, the adapter 220 notifies or provides an indication that the process of unlocking the storage device has failed. Otherwise, the adapter 220 applies the next possible key to unlock the storage device that was failed to unlock. Steps 430-460 are repeated until the adapter 220 successfully unlock the storage device or all the possible keys are evaluated.

Figure 5:
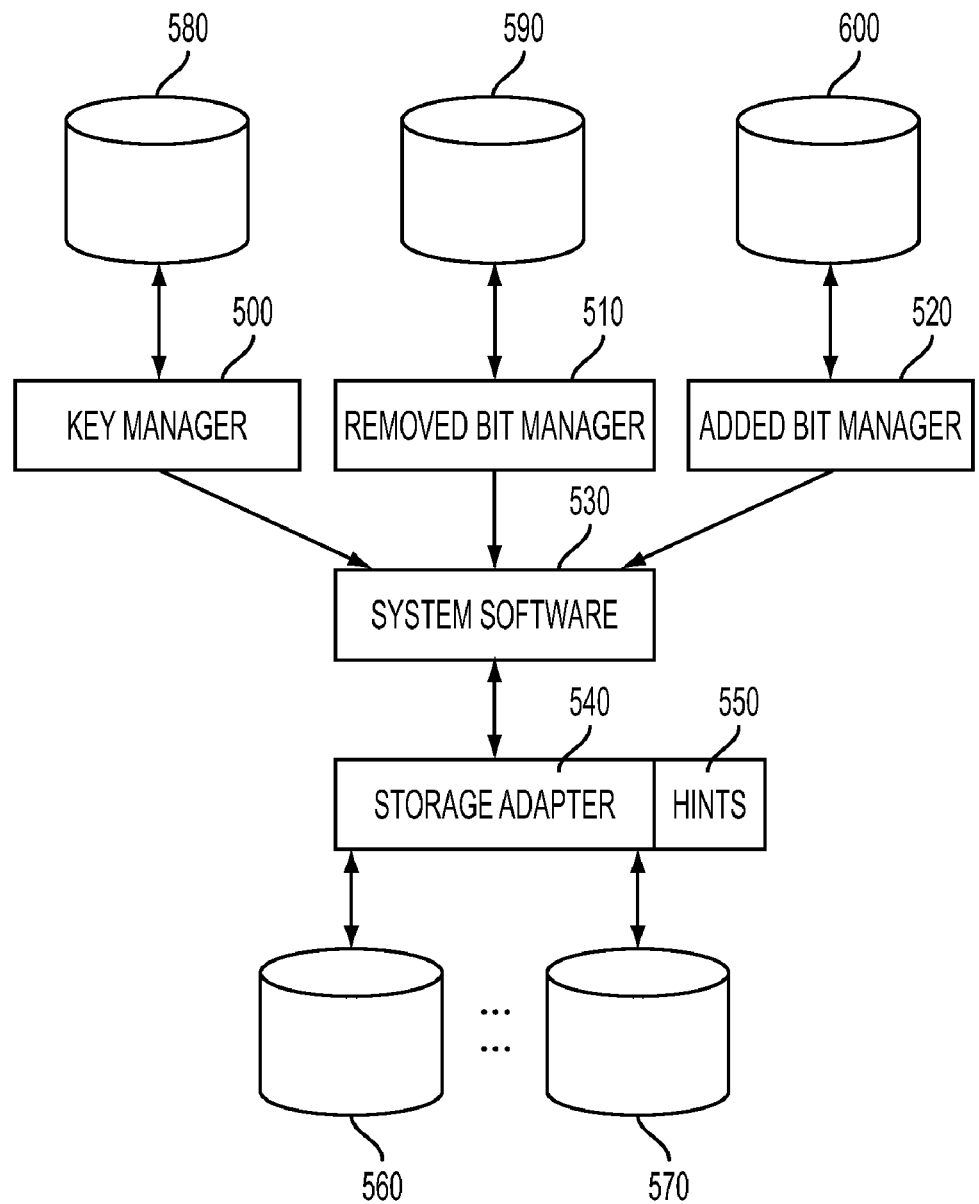
FIG. 5 illustrates another system diagram in one embodiment of the present invention.

FIG. 5 illustrates a system diagram in one embodiment of the present invention. To generate a hint, a module (e.g., system software 530 such as firmware) receives a key from a key manager 500. The key manager 500 includes a repository, a storage device or a database 580 that securely stores keys or SIDs and operates in association with the repository, storage device or database 580. The key manager distributes the keys or SIDs to the module (e.g., system software 530), authorized users or computing devices, e.g., desktops, laptops, PDAs, etc. In one embodiment, the key is a SID (e.g., SID 210). In one embodiment, the key is piece of information used to encrypt or decrypt data in a storage device by utilizing an encryption/decryption algorithm.

Then, the module removes bits from the key at one or more positions. The module stores the position(s) of the removed bits and the number of removed bits at each position. In one embodiment, the position(s) of the removed bits and the number of removed bits at each position are stored in a repository, storage device or database 590 associated with a removed bit manger 510. In one embodiment, the removed bit manager 510 includes a repository, storage device or database 590 that securely stores the position(s) of the removed bits and the number of removed bits at each position. The removed bit manager 510 operates in association with the repository, storage device or database 590. The removed bit manager 510 provides the position(s) of the removed bits and the number of removed bits at each position to the module (e.g., system software 530), authorized users or computing devices.

Then, the module adds bits to the key to generate the hint 550. In one embodiment, the module adds bits to the key at one or more positions. The module stores the position(s) of the added bits and the number of added bits of each position. In one embodiment the position(s) of the added bits and the number of added bits are stored in a repository, storage device or database 600 associated with an added bit manager 520. In one embodiment, the added bit manager 520 includes a repository, storage device or database 600 that securely stores the position(s) of the added bits and the number of added bits at each position. The added bit manager 520 operates in association with the repository, storage device or database 600. The added bit manager 520 provides the position(s) of the added bits and the number of added bits at each position to the module (e.g., system software 530), authorized users or computing devices. The module also stores the hint 550 at a storage device, repository or database.

When a user or an application (e.g., a database management system (DBMS)) wants to access data in a storage device (a disk 560, a disk 570, a disk array, a RAID, etc.), which is encrypted by a key, the module accesses key manger 500 to retrieve a corresponding key. Then, the module sends the retrieved key to a storage adapter 540. The storage adapter 540 manages a protocol to authenticate the retrieved key with the storage device and unlock the storage device so that data can be written to the storage device via an encryption algorithm and data can be read from the storage device via a decryption algorithm.

However, the storage adapter 540 may not be able to unlock the storage device or decrypt the data, if the key retrieved from the key manger 500 was corrupted or defected so that the key is different with an original key which was able to unlock the storage device or to decrypt the data. Then, the storage adapter 540 contacts the module to reconstruct possible keys to unlock the storage device or to decrypt the data.

To reconstruct the possible keys, the module first retrieves the hint associated with the storage device which cannot be unlocked. In one embodiment, the storage adapter 540 provides the hint to the module when requesting to reconstruct possible keys. After obtaining the hint from a storage device, database or the storage adapter 540, the module obtains the position(s) of added bits and the number of added bits at each position from the added bit manager 520. Then, the module removes the added bits from the hint at the each position where the bits were added.

Then, the module obtains the position(s) of removed bits and the number of removed bits at each position from the removed bit manager 510. If the total number of removed bits is N, the module places each possible N bits in the hint at position(s) of the removed bits. For example, assume that there are a first position of removed bits and a second position of removed bits. At the first position, m bits were removed. At the second position, k bits were removed. Then, the module places each possible m bits at the first position of the hint and places each possible k bits at the second position of the hint. By placing each possible m bits at the first position and each possible k bits at the second position, the module creates $2^{(m+k)}$ possible keys. Thus, if the total number of removed bits is N (i.e., m+k=N), the module creates $2^N$ possible keys.

Then, the module applies each of the $2^N$ possible keys to unlock the storage device that could not be unlocked.

In one embodiment, the module, the key manager 500, the removed bit manager 510 and the added bit manager 520 are implemented as firmware using a programming language (e.g., Assembly language, Binary Code, C, C++, Java, NET, etc.). In one embodiment, the module, the key manager 500, the removed bit manager 510 and the added bit manager 520 are recorded in a computer readable medium (e.g., CD (Compact Disc), DVD (Digital Versatile Disc), HDD (Hard Disk Drive), a memory) as an instruction (e.g., a machine language or assembly language) that is executed by a processor (e.g., Intel® Pentium®, IBM® Power PC®, AMD® Opteron®).

In another embodiment, the module, the key manager 500, the removed bit manager 510 and the added bit manager 520 are implemented as hardware on a reconfigurable hardware (e.g., FPGA (Field Programmable Gate Array) or CPLD (Complex Programmable Logic Device)) using a hardware description language (Verilog, VHDL, Handel-C, or System C). In a further embodiment, the module, the key manager 500, the removed bit manager 510 and the added bit manager 520 are implemented on a semiconductor chip (e.g., ASIC (Application-Specific Integrated Circuit)) using a semi custom design methodology (i.e., designing a chip using standard cells and a hardware description language).

In a further embodiment, the module, the key manager 500, the removed bit manager 510 and the added bit manager 520 are implemented as hardware through a computing device (e.g., a server, mainframe, desktop, laptop, etc.) by being executed in the computing device. The computing device comprises, but not limited to include, processor(s), memory(s), display device(s), input/output device(s) and network interface(s).

In one embodiment, the number of allowed tries to unlock a storage device is set to a fixed number, e.g., 1024. If the total number of removed bits is set to satisfy $2^N \leq$ the fixed number, the present invention can unlock the storage device, which cannot be unlocked with a key retrieved from a key manager 500, before all the allowed tries are exhausted so that data in the storage device becomes permanently locked and effectively lost forever. Thus, one embodiment of the present invention removes N bits from an original key when creating a hint. The N bits is set to satisfy that $2^N$ is less than or equal to a maximum number of allowed tries, e.g., 1024.

Following is a usage scenario that utilizes the present invention:

When a SID is updated from its default manufacturing value, a hint is generated that can be stored and used in a future to attempt to unlock a storage device should the SID becomes unavailable or unusable. Assume that the SID is 256 bits in length.

1. Initially, the hint is set to have a same value with the SID. Then, a number of bits are removed in the hint. For example, assume that 9 bits have been removed from the 256 bits reducing the length of the hint to 247 bits. (However, the present invention can remove any number of bits.)

2. To prevent determining the number of removed bits, a same number of random bits are added to the 247-bits hint to make it back to 256 bits. (However, the present invention can add any number of bits.) A position that these bits are added does not have to match a position where the bits were removed.

3. The position of the removed bits is known securely, e.g., by informing a limited authorized people, and is stored securely, e.g., by storing the position of removed bits in a document with a password protection. The value of the removed bits is never revealed and is discarded. The number of the removed bits is also known securely and stored securely.

4. The position of the added bits is known securely, e.g., by informing a limited authorized people, and is stored securely, e.g., by storing the position of added bits in a document with a password protection. The number of the added bits is also known securely and stored securely.

5. It is important that the position of the removed bits and the position of the added bits are not known to a same organization or a same person. The number of the remove bits and the number of added bits are not known to a same organization or a same person. For example, the position of removed bits and the number of removed bits may be known to an equipment supplier. The position of added bits and the number of added bits may be known to a customer. Thus, the SID cannot be reconstructed by a single organization or a single person.

6. The hint is known securely and stored securely.

7. If the SID becomes lost or unusable, the hint is used to attempt to unlock the storage device. Reconstructing the SID is based on the position of removed bits, the position of added bits, the number of removed bits and the number of added bits. An example of reconstructing the SID is described in following steps:

8. The hint is obtained via a GUI (Graphical User Interface) or API (Application Programming Interface) from a person or an organization who is securely storing it. The position of added bits and the number of added bits are obtained from a person or an organization who is securely storing them. Then, the added bits are removed from the hint, reducing the 256-bits hint to 247-bits hint.

9. The position of removed bits and the number of removed bits are obtained from a person or an organization who is securely storing them.

10. Based on the position of removed bits and the number of removed bits, 512 (000000000 to 111111111) possible 256-bits SIDs are generated by placing each possible 9 bits to the position of the removed bits.

11. Each of the possible 256-bits SIDs is then used to attempt to unlock the storage device. This may take up to 512 attempts which is less than a maximum number of allowed tries, e.g., 1024.

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented on a computer readable medium (e.g., a compact disc, a digital versatile disc, a hard disk, an optical disk, a solid state drive, etc.) embodying computer program instructions (e.g., C++, C, Java, Net, Assembly languages, binary code, etc.) being executed by a processor (e.g., IBM® PowerPC®, SUN® Sparc®, etc.) for causing a computer (e.g., a desktop, a laptop, a server, etc.) to perform one or more functions of this invention. The present invention further includes a method of deploying a computer program product including a program of instructions in a computer readable medium for one or more function of this invention, wherein, when the program of instructions is executed by a processor, the computer program product performs the one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art

What is claimed is:

1. A system for unlocking a storage device that has become locked or cannot be unlocked comprising:
    a key manager for securely storing a key having an original number of bits;
    an adapter for removing bits from the key;
    a removed bit manager for securely storing a position of the removed bits and the number of the removed bits (N);
    the adapter for adding bits to the key, in response to removing bits from the key, to generate a hint, a number of the added bits being less than the original number of bits in the key, a value of the added bits being different from a value of the removed bits corresponding to the added bits;

an added bit manager for securely storing a position of the added bits and the number of the added bits;

the adapter for removing the added bits from the hint at the position of the added bits, if the key in the key manager is lost or cannot unlock the storage device;

the adapter for placing each possible N bits in the hint at the position of the removed bits to generate $2^N$ possible keys; and the adapter for applying each of the $2^N$ possible keys until the storage device is unlocked.

2. The system according to claim 1, wherein the key manager includes a storage device or a database and operates in association with the storage device or the database.

3. The system according to claim 1, wherein the removed bit manager includes a storage device or a database and operates in association with the storage device or the database.

4. The system according to claim 1, wherein the added bit manager includes a storage device or a database and operates in association with the storage device or the database.

5. The system according to claim 1, wherein the key is a SID (Security Identifier).

6. The system according to claim 1, wherein the key is used to encrypt or decrypt data in a storage device by utilizing an encryption/decryption algorithm.

7. The system according to claim 6, wherein the encryption/decryption algorithm is one or more of: RSA (Rivest Shamir Adleman), DES (Data Encryption Standard), Blowfish, IDEA (International Data Encryption Algorithm), SEAL (Software-optimized Encryption Algorithm), and RC4 (Rivest Cipher 4).

8. The system according to claim 1, wherein the removed bit manager and the added bit manger are not managed by a same organization or a same person.

9. The system according to claim 1, wherein the hint is securely stored in a storage device.

10. A method for unlocking a storage device that has become locked or cannot be unlocked comprising:

storing a key having an original number of bits;

removing bits from the key;

storing a position of the removed bits and the number of the removed bits (N);

adding bits to the key, in response to removing bits from the keys, to generate a hint, a number of the added bits being less than the original number of bits in the key, a value of the added bits being different from a value of the removed bits corresponding to the added bits;

storing a position of the added bits and the number of the added bits;

removing the added bits from the hint at the position of the added bits, if the key in the key manager is lost or cannot unlock the storage device;

placing each possible N bits in the hint at the position of the removed bits to generate $2^N$ possible keys; and applying each of the $2^N$ possible keys to the storage device until the storage device is unlocked.

11. The method according to claim 10, wherein the key is securely stored in a storage device or a database.

12. The method according to claim 10, wherein the position of the removed bits and the number of the removed bits are securely stored in a storage device or a database.

13. The method according to claim 10, wherein the position of the added bits and the number of the added bits are securely stored in a storage device or a database.

14. The method according to claim 10, wherein the key is a SID (Security Identifier).

15. The method according to claim 10, wherein the key is used to encrypt or decrypt data in a storage device by utilizing an encryption/decryption algorithm.

16. The method according to claim 15, wherein the encryption/decryption algorithm is one or more of: RSA (Rivest Shamir Adleman), DES (Data Encryption Standard), Blowfish, IDEA (International Data Encryption Algorithm), SEAL (Software-optimized Encryption Algorithm), and RC4 (Rivest Cipher 4).

17. The method according to claim 10, wherein the position of the removed bits and the position of added bits are not known to a same organization or a same person.

18. The method according to claim 10, wherein the hint is securely stored in a storage device.

19. A computer readable storage device embodying computer program instructions being executed by a processor for causing a computer to perform method steps for unlocking a storage device that has become locked or cannot be unlocked, said method steps comprising the steps of claim 10.

20. A method of deploying a computer program product including programs of instructions in a computer readable storage device for unlocking a storage device that has become locked or cannot be unlocked, wherein, when the programs of instructions are executed by at least one processor, the computer program product performs the steps of claim 10.

* * * * *